US010740923B2

United States Patent
Nakayama

(10) Patent No.: US 10,740,923 B2
(45) Date of Patent: Aug. 11, 2020

(54) FACE DIRECTION ESTIMATION DEVICE AND FACE DIRECTION ESTIMATION METHOD FOR ESTIMATING THE DIRECTION OF A FACE REPRESENTED ON AN IMAGE

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 391 days.

(21) Appl. No.: 15/794,061

(22) Filed: Oct. 26, 2017

(65) Prior Publication Data

US 2018/0165832 A1 Jun. 14, 2018

(30) Foreign Application Priority Data

Dec. 13, 2016 (JP) .................. 2016-241143

(51) Int. Cl.
*G06T 7/73* (2017.01)
*G06K 9/32* (2006.01)
(Continued)

(52) U.S. Cl.
CPC ............ *G06T 7/74* (2017.01); *G06K 9/00208* (2013.01); *G06K 9/00221* (2013.01);
(Continued)

(58) Field of Classification Search
None
See application file for complete search history.

(56) References Cited

U.S. PATENT DOCUMENTS 10,082,877 B2 * 9/2018 Tokish .................. G06F 3/016
2007/0217683 A1 * 9/2007 Kinoshita .......... G06K 9/00214
382/190

(Continued)

FOREIGN PATENT DOCUMENTS

EP 1835446 A2 9/2007
JP 2004-094491 3/2004
(Continued)

OTHER PUBLICATIONS

Takeshi Hayashi et al., "Picture processing technology for a driver watch", ITE Technical Report, vol. 61, No. 12, pp. 1701 to 1704, 2007 (9 pages), by the Institute of Image Information and Television Engineers (ITE); Partial English translation of Section 3 (from line 19, in the left column on p. 1702, to last line in the right column on p. 1703).

(Continued)

*Primary Examiner* — Tahmina N Ansari
(74) *Attorney, Agent, or Firm* — Fujitsu Patent Center

(57) ABSTRACT

A non-transitory computer-readable recording medium has recorded thereon a computer program for face direction estimation that causes a computer to execute a process including: generating, for each presumed face direction, a face direction converted image by converting the direction of the face represented on an input image into a prescribed direction; generating, for each presumed face direction, a reversed face image by reversing the face represented on the face direction converted image; converting the direction of the face represented on the reversed face image to be the presumed face direction; calculating, for each presumed face direction, an evaluation value that represents the degree of difference between the face represented on the reversed face image and the face represented on the input image, based on the conversion result; and specifying, based on the evaluation value, the direction of the face represented on the input image.

19 Claims, 10 Drawing Sheets

(51) Int. Cl.
  *G06K 9/00* (2006.01)
  *G06K 9/62* (2006.01)
  *G06K 9/46* (2006.01)
(52) U.S. Cl.
  CPC ..... *G06K 9/00248* (2013.01); *G06K 9/00281* (2013.01); *G06K 9/00845* (2013.01); *G06K 9/3208* (2013.01); *G06K 9/4671* (2013.01); *G06K 9/6202* (2013.01); *G06T 2207/10024* (2013.01); *G06T 2207/30201* (2013.01); *G06T 2207/30268* (2013.01)

(56) References Cited

U.S. PATENT DOCUMENTS

| | | |
|---|---|---|
| 2009/0304232 A1 | 12/2009 | Tsukizawa |
| 2011/0267489 A1* | 11/2011 | Sagawa ................ G06K 9/3233 348/222.1 |
| 2014/0093142 A1* | 4/2014 | Hayasaka .......... G06K 9/00221 382/118 |
| 2018/0165832 A1* | 6/2018 | Nakayama ................ G06T 7/74 |

FOREIGN PATENT DOCUMENTS

| | | |
|---|---|---|
| JP | 2007-249280 | 9/2007 |
| JP | 2008-310392 | 12/2008 |
| JP | 2010-245721 | 10/2010 |
| WO | 2004/025564 A1 | 3/2004 |
| WO | 2008/007781 | 1/2008 |

OTHER PUBLICATIONS

Partial European Search Report dated May 14, 2018 for corresponding European Patent Application No. 17198585.6, 11 pages.

* cited by examiner

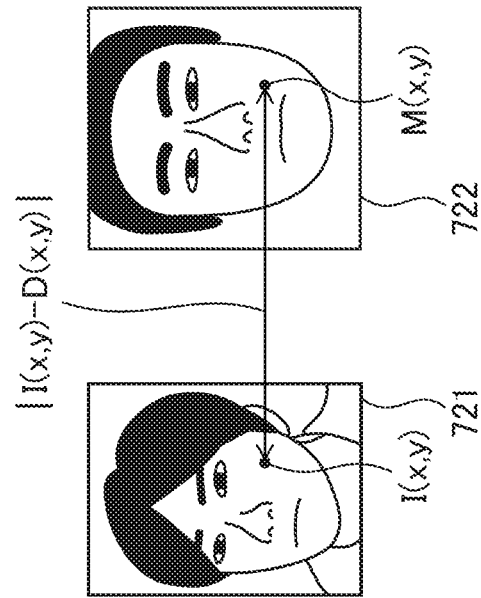
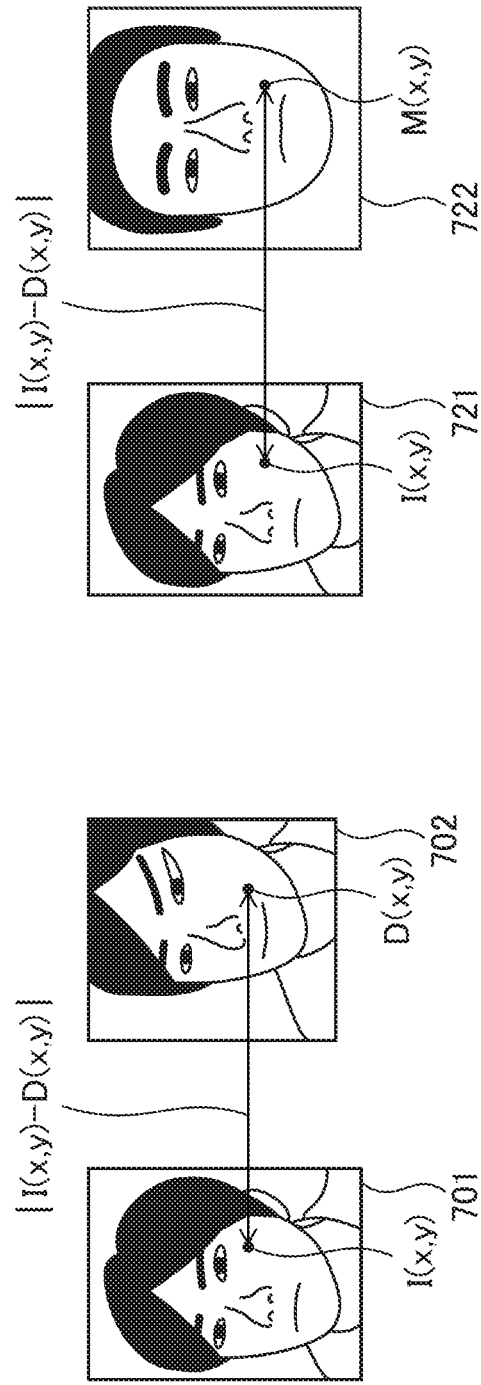
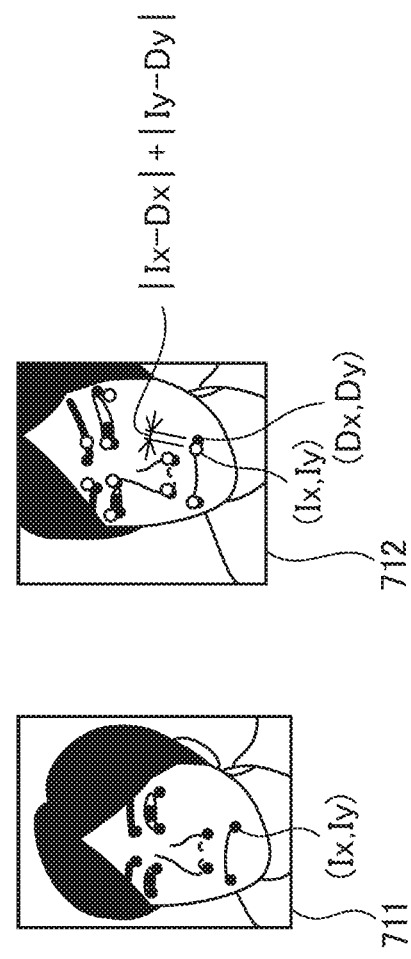

FACE DIRECTION ESTIMATION DEVICE AND FACE DIRECTION ESTIMATION METHOD FOR ESTIMATING THE DIRECTION OF A FACE REPRESENTED ON AN IMAGE

CROSS-REFERENCE TO RELATED APPLICATION

This application is based upon and claims the benefit of priority of the prior Japanese Patent Application No. 2016-241143, filed on Dec. 13, 2016, and the entire contents of which are incorporated herein by reference.

FIELD

The embodiments discussed herein are related to a face direction estimation device and a face direction estimation method for estimating the direction of a face represented on an image.

BACKGROUND

A technique of estimating a direction of a face from an image representing the face has been studied.

A face direction detection sensor for detecting the direction of, for example, a driver's face is known. This face direction detection sensor detects a face border and a face part based on edges detected from an input image, and estimates the center of the face based on the detected face border and face part. This face direction detection sensor then computes the face direction angle from the face border and the center of the face center, based on the hypothesis that the face is cylindrical.

In another technique of face direction estimation, positions of nodes that respectively correspond to feature points of a face are defined on a three-dimensional model, and the nodes are projected onto an image of the face. Then, an estimated error amount indicating positional displacement between the current three-dimensional model and the feature points is calculated based on projected points of the nodes, three-dimensional positions of the feature points of the face in the image are estimated based on the estimated error amount and the current three-dimensional model, and based on the result of the estimation, the face direction is estimated. Further, a technique is known in which the direction of a face on an image is converted to create a frontal face, and the face direction is estimated based on the degree of left-right symmetry of the frontal face (for example, see HAYASHI, et al., "Image Processing Technique for Monitoring Driver", The Journal of the Institute of Image Information and Television Engineers, Vol. 61, No. 12, pp. 1701-1704, 2007, Japanese Laid-open Patent Publication No. 2007-249280, and Japanese Laid-open Patent Publication No. 2004-94491).

SUMMARY

Estimation of the direction of a subject's face with high precision may be desired. For example, in a drive assistance device for a vehicle, when the driver of the vehicle looks aside with no visual awareness of the front, accurate estimation of the direction of the driver's face at all times is desired so that the driver can be warned.

However, in the face direction detection sensor described above, since the human face is assumed to be of a cylindrical shape, which is different from the actual shape of the human face, the estimated face direction may have a large error. In addition, in the technique of estimating a face direction by using a three-dimensional model, especially when an estimated error amount is small, it may be difficult to distinguish whether the positional displacement of the feature points of the face is due to individuality of the face, or due to a displacement between the direction of the face represented on the three-dimensional model and the direction of the face on the image. In such a case, the estimated face direction may have a large error. Further, in the technique in which the face direction is estimated based on the degree of left-right symmetry of the frontal face, when the actual face direction is close to the front direction, or when the face direction presumed in determination of the degree of left-right symmetry is close to the actual face direction, degradation of the degree of left-right symmetry may be small. Thus, this technique may be insufficient in terms of estimation accuracy of the face direction.

In one embodiment, a non-transitory computer-readable recording medium having recorded thereon a computer program for face direction estimation is provided. The computer program for face direction estimation causes a computer to execute a process including: inputting an input image representing a face; generating, for each face direction presumed for the face represented on the input image, a face direction converted image by converting the direction of the face represented on the input image into a prescribed direction in accordance with the presumed face direction; generating, for each of the presumed face directions, a reversed face image by reversing the face represented on the face direction converted image; converting, for each of the presumed face directions, the direction of the face represented on the reversed face image to be the presumed face direction, or converting the direction of the face represented on the input image into the prescribed direction in accordance with the presumed face direction; calculating, for each of the presumed face directions, an evaluation value that represents a degree of difference between the face represented on the reversed face image and the face represented on the input image, based on a result of the conversion; and specifying, based on the evaluation value, one face direction among the presumed face directions as the direction of the face represented on the input image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A is an explanatory drawing of the index used in the calculation of an evaluation value.

FIG. 7B is an explanatory drawing of the index used in the calculation of an evaluation value.

FIG. 7C is an explanatory drawing of the index used in the calculation of an evaluation value.

DESCRIPTION OF EMBODIMENTS

The following will describe a face direction estimation device with reference to the drawings. This face direction estimation device converts the direction of a face represented on an image into the front direction in accordance with a presumed face direction, and further, horizontally reverses the face directed to the front direction. This face direction estimation device then converts the horizontally reversed face directed to the front direction into the presumed face direction, and thereafter calculates an evaluation value that represents the degree of difference between the converted face on an image and the face on the original image. This face direction estimation device then calculates an evaluation value for each of the presumed face directions, and estimates that the direction presumed when the evaluation value is minimum, is the actual direction of the face represented on the image.

In the present embodiment, the face direction estimation device is mounted on a drive assistance device for a vehicle, and estimates the direction of the vehicle driver's face based on an image representing the driver's face. However, the face direction estimation device may be used for other applications, and may be used for estimating the face direction of a subject other than a driver.

Figure 1:
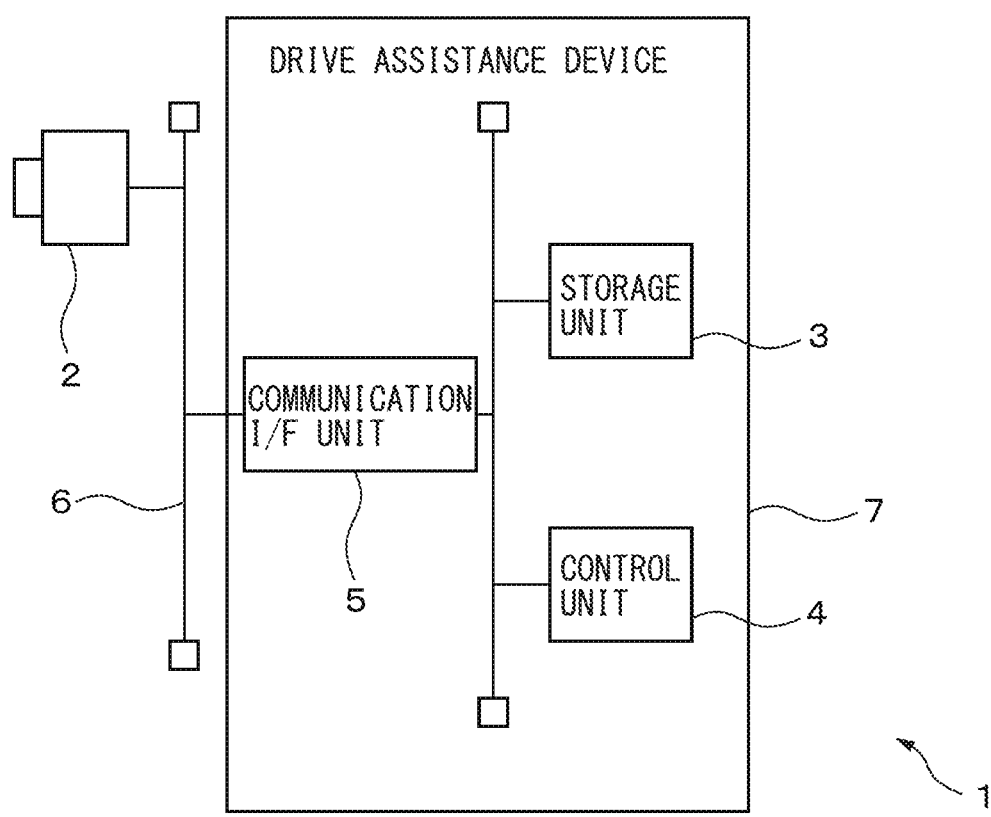
FIG. 1 is a hardware configuration diagram of a drive assistance device on which a face direction estimation device is mounted according to one embodiment.
Figure 2:
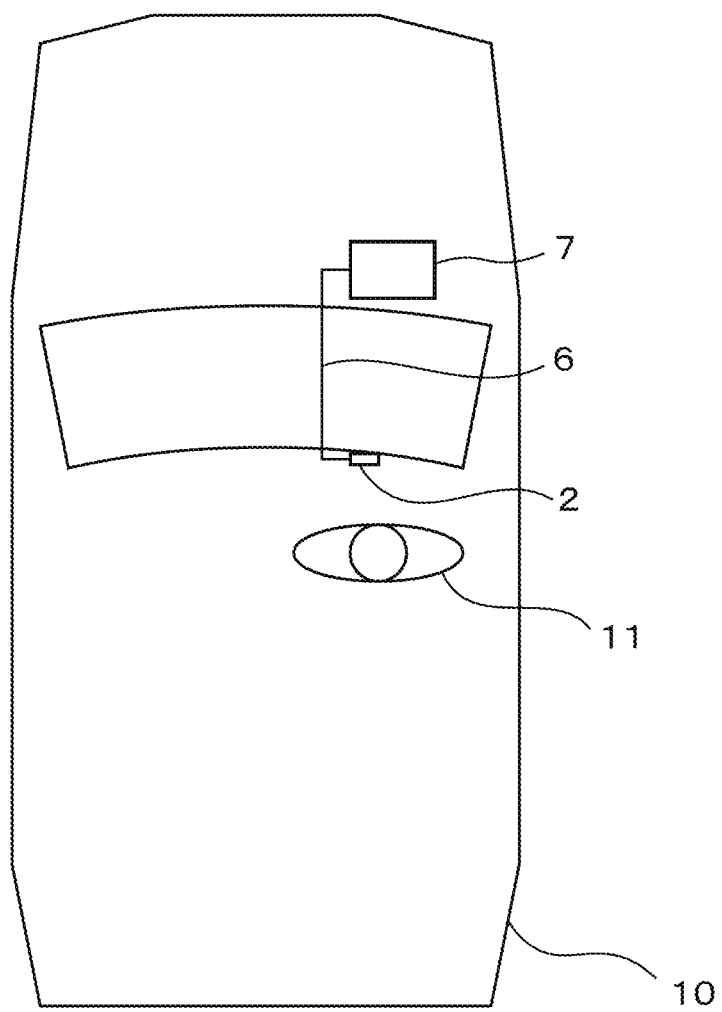
FIG. 2 illustrates an example of the arrangement of a drive assistance device in a vehicle.

FIG. 1 is a hardware configuration diagram of a drive assistance device on which a face direction estimation device is mounted according to one embodiment. FIG. 2 illustrates an example of the arrangement of a drive assistance device in a vehicle. A drive assistance device 1 includes a camera 2, a storage unit 3, a control unit 4, and a communication interface unit 5. The drive assistance device 1 may further include an exterior camera (not illustrated) for photographing the surroundings of the vehicle 10, a display (not illustrated) for displaying various kinds of information, and the like. The storage unit 3, the control unit 4, and the communication interface unit 5 are provided on, for example, a substrate 7. In addition, the camera 2 is connected with the control unit 4 via an in-vehicle network 6 in conformity with a standard such as Controller Area Network, and the communication interface unit 5. Further, the control unit 4 is connected with an electronic control unit (ECU) (not illustrated) of the vehicle 10 via the communication interface unit 5 and the in-vehicle network 6.

The camera 2 is attached, for example, near the ceiling in the front of a vehicle interior, for example, near the rearview mirror, in a manner facing a driver 11. The camera 2 photographs a photographing range including an expected position of the driver 11 for each period (for example, 50 msec to 100 msec) to thereby generate an image, and outputs the generated image to the control unit 4 via the in-vehicle network 6. For this purpose, the camera 2 includes, for example, an image sensor that is formed of a solid state image sensor such as a CCD or a C-MOS, and an imaging optical system that forms an image of the photographing range on the image sensor. The image generated by the camera 2 may be, for example, a color image represented by the RGB colorimetric system, the HLS colorimetric system or the YCbCr colorimetric system, or a monochrome image.

The storage unit 3 includes, for example, a readable/writable non-volatile or volatile semiconductor memory, and a read-only non-volatile semiconductor memory. The storage unit 3 stores a program for a drive assistance process including a face direction estimation process, which is executed on the control unit 4. In addition, the storage unit 3 stores various kinds of data that are used or generated in the drive assistance process.

The control unit 4 includes one or more processors and the peripheral circuits thereof, and is connected with the respective units of the drive assistance device 1 and the ECU through a signal line or the in-vehicle network 6. The control unit 4 executes a drive assistance process for each period, for example, every time an image is acquired from the camera 2. For example, when determining that the driver is not visually aware of the front based on an estimated face direction, the control unit 4 outputs a warning sound via a speaker (not illustrated) provided in the interior of the vehicle 10 via the communication interface unit 5.

The communication interface unit 5 includes an interface circuit for connecting with the in-vehicle network 6. The communication interface unit 5 outputs, to the control unit 4, various kinds of signals such as an image from the camera 2 received via the in-vehicle network 6. In addition, the communication interface unit 5 outputs, to the in-vehicle network 6 via the communication interface unit 5, various kinds of signals output from the control unit 4.

Figure 3:
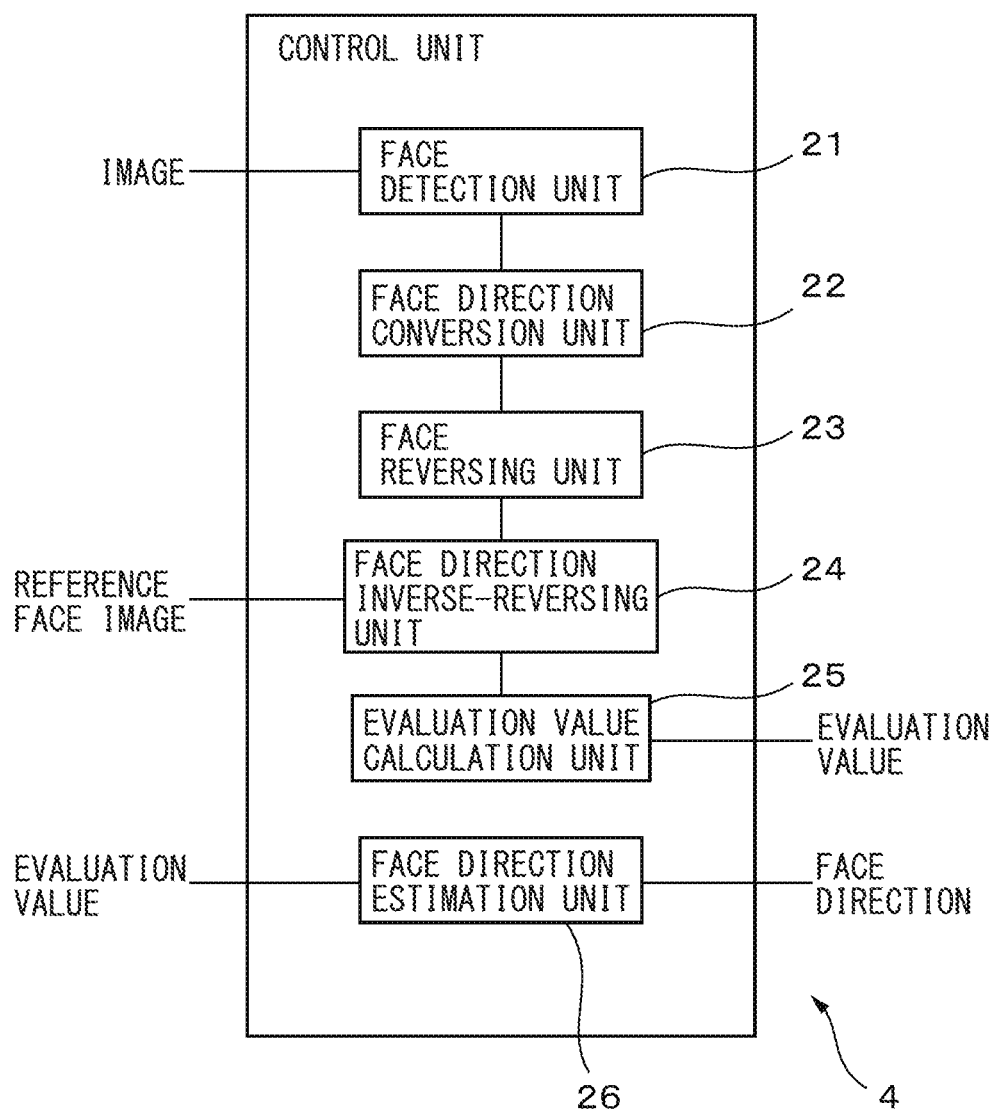
FIG. 3 is a function block diagram of a control unit relating to a face direction estimation process.

FIG. 3 is a function block diagram of the control unit 4 relating to a face direction estimation process. The control unit 4 includes a face detection unit 21, a face direction conversion unit 22, a face reversing unit 23, a face direction inverse-reversing unit 24, an evaluation value calculation unit 25, and a face direction estimation unit 26. These units of the control unit 4 are functional modules that are implemented by a computer program executed on the processor of the control unit 4. Alternatively, these units of the control unit 4 may be mounted on the drive assistance device 1 as one or more integrated circuits formed by integrating circuits corresponding to the respective units, separately from the processor of the control unit 4.

Note that these units of the control unit 4 execute their respective processes for each of the images acquired from the camera 2. Thus, in the following, the processes of the units with respect to one image will be explained as an example. In addition, an image acquired from the camera 2 is hereinafter referred to as an input image. In addition, these units of the control unit 4 may use, as a pixel value, a luminance value or any kind of color component values.

Figure 4:
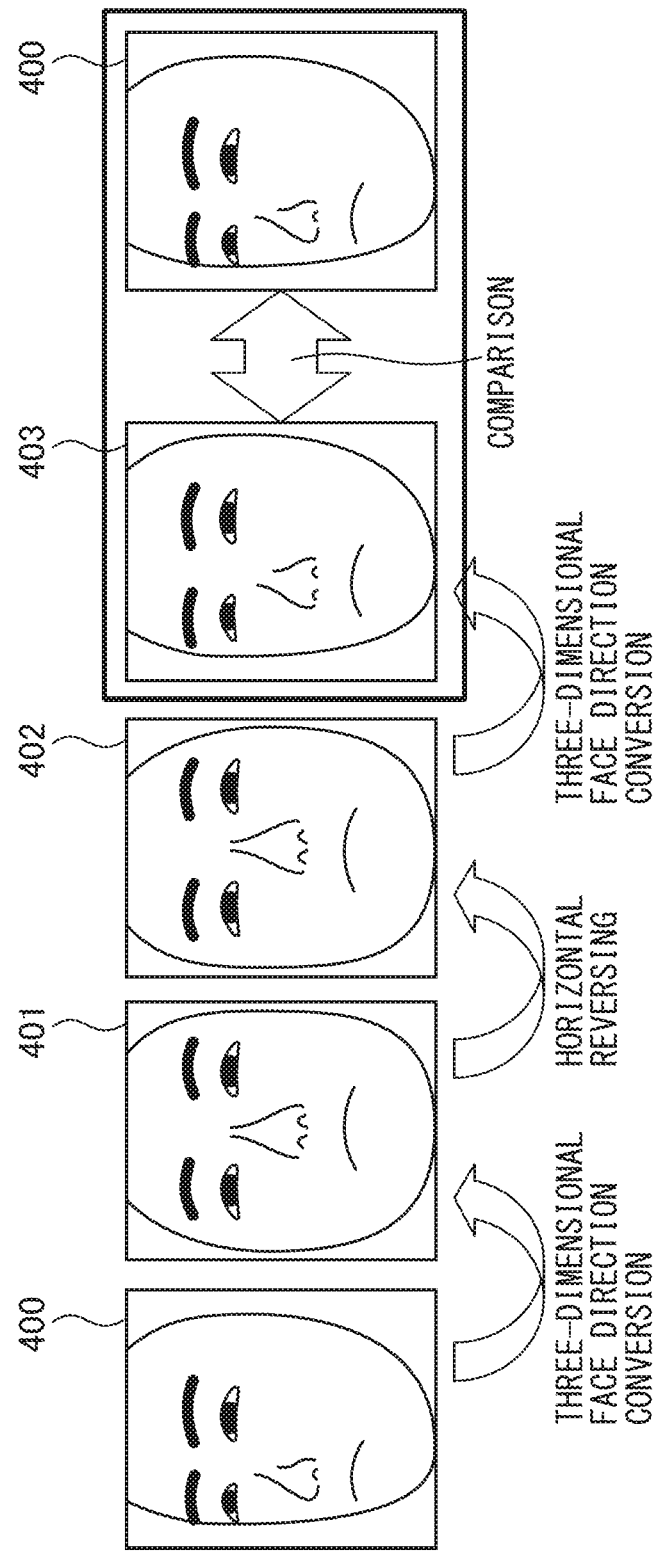
FIG. 4 is an explanatory drawing of an outline of a face direction estimation process.

FIG. 4 is a drawing explaining an outline of a face direction estimation process executed by the control unit 4. The control unit 4 converts, in accordance with a presumed face direction, a direction of a face represented on an input image 400 in such a way so as to direct the face to the front when the presumed face direction is the same as the actual face direction (i.e., in such a way that the face looks at the camera 2) to thereby generate a frontal face image 401. The control unit 4 then horizontally reverses the face represented on the frontal face image 401 to generate a reversed face image 402. Further, the control unit 4 converts the direction of the face represented on the reversed face image 402 to be the presumed face direction to generate a reversed face image for comparison 403. The control unit 4 then compares the input image 400 with the reversed face image for comparison 403 to calculate an evaluation value that represents the degree of difference between the face represented on the input image 400 and the face represented on the reversed face image for comparison 403.

The control unit 4 calculates an evaluation value for each of the presumed face directions while varying the presumed face directions within a prescribed range of face directions. The control unit 4 then estimates that the presumed face direction when the evaluation value is minimum is the actual direction of the face represented on the input image.

The face detection unit 21 detects a face represented on an input image. In the present embodiment, the face detection unit 21 detects, on an input image, feature points representing features of a face. For example, the face detection unit 21 detects feature points whose pixel values change along a corner shape, by applying a corner detection filter such as a Harris filter to an input image. Note that the face detection unit 21 may detect the feature points of a face by using any of other various techniques for detecting the feature points of a face represented on an image.

The face detection unit 21 performs, for each of the detected feature points, template matching with a local region that includes any facial part feature point on a face extraction model image prepared in advance, by using a prescribed range (for example, 10×10 pixels) on the input image including the feature point as a template. Note that the face extraction model image is, for example, an image representing a model of an average human face, and represents facial part feature points such as the inner and outer corners of the left and right eyes, the left and right mouth ends. The face detection unit 21 calculates, by performing template matching, a normalized cross-correlation value between the template and the local region, a square sum of the errors between corresponding pixels, or the like, as an evaluation value that represents the degree of matching between the template and the local region.

The face detection unit 21 determines, for each of a prescribed number (for example, ten) of facial part feature points on the face extraction model image, a best matching feature point among the feature points detected from the input image, as the facial part feature point on the input image. The face detection unit 21 may determine the feature point that best matches with the facial part feature point, based on the evaluation value between the local region including the facial part feature point and the template of each of the feature points. When the evaluation value is a normalized cross-correlation value, a feature point that maximizes the evaluation value is the feature point that best matches with the facial part feature point, on the other hand, when the evaluation value is a square sum of the errors, a feature point that minimizes the evaluation value is the feature point that best matches with the facial part feature point.

The size of the driver's face represented on the input image varies depending on the distance between the camera 2 and the driver's face and the like. However, when estimating the face direction, it is preferable that the size of the face and the position of each of the facial part feature point be constant. This is because it can be prevented that variation in the size of the face on an image, or variation in the position of each of the facial part feature point depending on the inclination or position of the face affect the evaluation value. In view of this, the face detection unit 21 generates a normalized face image in which each of the facial part feature points detected on the input image is positioned at the facial part feature point on the face extraction model image.

In order to generate the normalized face image, the face detection unit 21 calculates an affine transformation parameter that transforms the position of each point on the input image in such a way that each of the facial part feature points detected on the input image is positioned at the facial part feature point on the normalized face image. For example, affine transformation is represented by the following equation.

$$\begin{bmatrix} x_i^D \\ y_i^D \end{bmatrix} = R_{norm} \cdot \begin{bmatrix} x_i^M \\ y_i^M \end{bmatrix} + T_{norm} \quad (1)$$

$$R_{norm} = \begin{bmatrix} a & b \\ -b & a \end{bmatrix}$$

$$T_{norm} = \begin{bmatrix} c \\ d \end{bmatrix}$$

$R_{norm}$ is a rotation matrix that represents a rotation component, and $T_{norm}$ is a translation vector that represents a translation component. In addition, $(x_i^M, y_i^M)$ represents the coordinates of an i-th point (for example, the facial part feature point) on the normalized face image, and $(x_i^D, y_i^D)$ represents the coordinates of a corresponding i-th point on the input image.

A vector $P^D = (x_1^D, y_1^D, x_2^D, y_2^D, \ldots, x_K^D, y_K^D)$ in which the coordinate values of each of the detected facial part feature points are respectively set as elements will be considered (K is the number of facial part feature points). In this case, the following equation holds from equation (1).

$$P^D = PM \cdot RT_{norm} \quad (2)$$

$$P^D = \begin{bmatrix} x_1^D \\ y_1^D \\ x_2^D \\ y_2^D \\ \vdots \\ x_K^D \\ y_K^D \end{bmatrix}, PM = \begin{bmatrix} x_1^M & y_1^M & 1 & 0 \\ y_1^M & -x_1^M & 0 & 1 \\ x_2^M & y_2^M & 1 & 0 \\ y_2^M & -x_2^M & 0 & 1 \\ \vdots & \vdots & \vdots & \vdots \\ x_K^M & y_K^M & 1 & 0 \\ y_K^M & -x_K^M & 0 & 1 \end{bmatrix}, RT_{norm} = \begin{bmatrix} a \\ b \\ c \\ d \end{bmatrix}$$

Accordingly, the face detection unit 21 is able to calculate elements of the rotation matrix $R_{norm}$ and elements of the translation vector $T_{norm}$ in the affine transformation, by solving the following equation.

$$RT_{norm} = (PM^T \cdot PM)^{-1} \cdot PM^T \cdot P^D \quad (3)$$

Note that the face detection unit 21 may apply a least squares method in order to solve equation (3).

When the affine transformation parameters are calculated, the face detection unit 21 calculates, for each of the pixels of the normalized face image, a corresponding position on the input image in accordance with equation (1). The face detection unit 21 then calculates a pixel value of the corresponding position by an interpolation process using a value of a neighboring pixel thereof, and determines the pixel value of the corresponding position as the value of the pixel of the normalized image, thereby generating the normalized face image. Note that the reason for using the interpolation process is that coordinate values of the corresponding position may not be integer values. In addition, as the interpolation process, for example, bilinear interpolation or bicubic interpolation may be used.

The face detection unit 21 stores the generated normalized face image in the storage unit 3.

The face direction conversion unit 22 generates, for each of the presumed face directions included in the prescribed range of face directions, a face direction converted image by converting the direction of the face represented on the normalized face image into a prescribed direction in accordance with the presumed face direction. In the present embodiment, the face direction conversion unit 22 generates a frontal face image by converting the direction of the face on the normalized face image in such a way as to direct the face to the front direction with respect to the camera 2 when the direction of the face represented on the input image is the presumed face direction. Note that the frontal face image is an example of the face direction converted image. In addition, the front direction is an example of the prescribed direction.

As described above, presumed face directions are set, within a prescribed range of face directions, for both or one of a yaw angle and a pitch angle on a prescribed angle basis. In view of this, the face direction conversion unit 22 generates a frontal face image for each of the presumed face directions. Note that the prescribed range of face directions may be set as, for example, 25° to the right and left relative to the front direction regarding the yaw angle, and 20° to the up and down relative to the front direction regarding the pitch angle. In addition, the prescribed angle basis may be set as, for example, a 5° basis. However, the prescribed range of face directions and the prescribed angle basis are not limited to the examples.

In the present embodiment, in order to convert the face direction, the face direction conversion unit 22 uses a three-dimensional face shape model that represents the three-dimensional shape of a human face.

Figure 5:
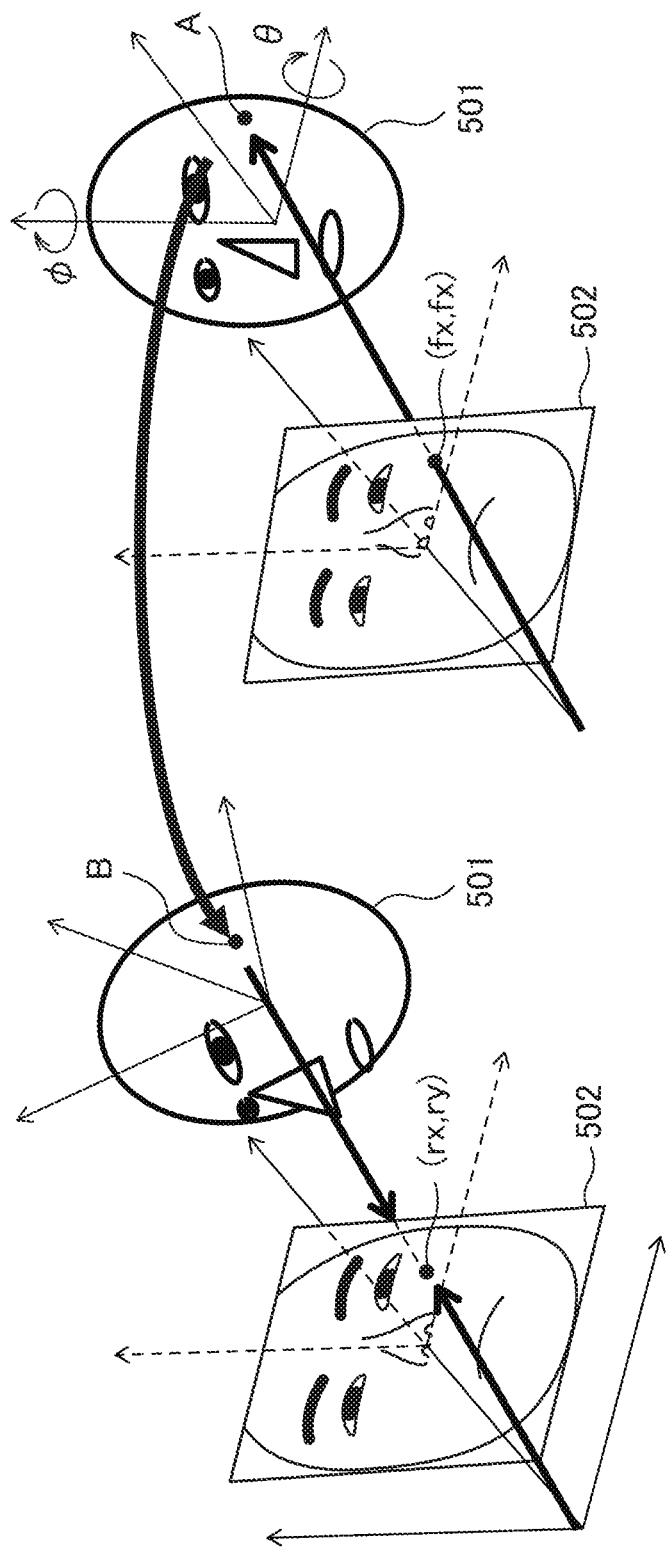
FIG. 5 is a drawing explaining an outline of a face direction conversion process using a three-dimensional face shape model.

FIG. 5 is a drawing explaining an outline of a face direction conversion process using a three-dimensional face shape model. An interest pixel f=(fx, fy) on a frontal face image 500 obtained after face direction conversion is projected onto a three-dimensional face shape model 501 facing the front direction, and a three-dimensional position of the projected point A is calculated. Then, the three-dimensional face shape model 501 is rotated about a yaw axis and a pitch axis of the three-dimensional face shape model 501 in accordance with a presumed face direction, and the three-dimensional position of a point B corresponding to the projected point A is calculated. The point B is projected onto a normalized face image 502, and thereby a corresponding point r=(rx, ry) on the normalized face image 502, which corresponds to the interest pixel f=(fx, fy), is calculated. Then, the pixel value of the corresponding point r=(rx, ry) on the normalized face image 502 is determined as the pixel value of the interest pixel f=(fx, fy) of the frontal face image 500. Note that the pixel value of the corresponding point r is calculated by, for example, an interpolation process using the value of a pixel neighboring the corresponding point r.

The face direction conversion unit 22 may use, as the interpolation process, for example, bilinear interpolation or bicubic interpolation. Note that the reason for using the interpolation process is that coordinate values (rx, ry) of the corresponding point r may not be integer values. The face direction conversion unit 22 is able to generate the frontal face image 500 corresponding to the presumed face direction, by performing the above-described processing for each of the pixels on the frontal face image 500.

The following will describe the face direction conversion process in detail.

A three-dimensional face shape model is defined as, for example, a set of three-dimensional triangle patches $P^i$ $\{P^i; i \in \{1, 2, \ldots, N\}\}$ (N is a total number of triangle patches). The individual triangle patch represents a part of the surface of the face in the three-dimensional face shape model. Each vertex of the patch $P^i$ is defined as $V_j^i (j \in \{1,2,3\})$. It is assumed that the three-dimensional face shape model is arranged in such a way that the cranial center of gravity is positioned at a position (X0, Y0, Z0) in a camera coordinate system with the origin at a position of a virtual camera corresponding to a normalized face image. Note that, in the camera coordinate system, the Z direction represents the direction parallel with the optical axis. The X direction and the Y direction represent the horizontal direction and the vertical direction in the normalized face image, respectively.

The face direction conversion unit 22 projects, in accordance with, for example, a pinhole model, each point on a frontal face image onto a three-dimensional face shape model. In view of this, the face direction conversion unit 22 calculates a line-of-sight vector (mx, my, 1) corresponding to a interest pixel (fx, fy) on a normalized face image, in accordance with the following equation.

$$mx = \frac{(fx - CX)}{FX}$$
$$my = \frac{(fy - CY)}{FY}$$
(4)

FX and FY represent horizontal and vertical focal lengths of a virtual camera corresponding to the normalized face image. In addition, CX and CY are the coordinates of a point on the normalized face image that correspond to an optical axis direction of the virtual camera.

The face direction conversion unit 22 specifies a patch that intersects with the line-of-sight vector among patches of the three-dimensional face shape model. At that time, the face direction conversion unit 22 may calculate, for each of the patches, a point of intersection between a plane representing the patch and the line-of-sight vector, and may specify a patch whose point of intersection lies within the patch as the patch that intersects with the line-of-sight vector. The face direction conversion unit 22 then determines the point of intersection as the projected point A on the three-dimensional face shape model corresponding to the interest pixel (fx, fy) on the normalized face image.

The face direction conversion unit 22 calculates the three-dimensional position of a point B=(Bx, By, Bz) corresponding to a projected point A=(Ax, Ay, Az) when the three-dimensional face shape model is rotated about a yaw axis and a pitch axis of the three-dimensional face shape model in accordance with a presumed face direction, in accordance with the following equation.

$$B = R \cdot (A - G) + G \quad (5)$$

$$R = R_\phi \cdot R_\theta$$

$$R_\phi = \begin{pmatrix} \sin\phi & 0 & \cos\phi \\ 0 & 1 & 0 \\ \cos\phi & 0 & -\sin\phi \end{pmatrix}, R_\theta = \begin{pmatrix} 1 & 0 & 0 \\ 0 & \cos\theta & -\sin\theta \\ 0 & \sin\theta & \cos\theta \end{pmatrix},$$

Wherein φ represents a rotation angle about the yaw axis from the front direction corresponding to the presumed face direction, i.e., represents a yaw angle. In addition, θ represents a rotation angle about the pitch axis from the front direction corresponding to the presumed face direction, i.e., represents a pitch angle. $R_\phi$ and $R_\theta$ are a rotation matrix that represents rotation about the yaw axis and a rotation matrix that represents rotation about the pitch axis, respectively. In addition, G=(X0, Y0, Z0) is the position of the cranial center of gravity of the three-dimensional face shape model, i.e., the point where the yaw, pitch, and roll rotation axes intersect with one another.

The face direction conversion unit 22 calculates a corresponding point r=(rx, ry) of the interest pixel (fx, fy), by projecting the point B onto the normalized face image in accordance with the following equation.

$$rx = \frac{FX \times Bx}{Bz} + CX \quad (6)$$

$$ry = \frac{FY \times By}{Bz} + CZ$$

The face direction conversion unit 22 may then calculate the pixel value of the corresponding point r by executing an interpolation process based on the pixel value of a neighboring pixel, and may determine the pixel value of the corresponding point r as the pixel value of the interest pixel (fx, fy) of the frontal face image.

Note that, for convenience of explanation, equations (4) to (6) will be hereinafter written collectively as follows.

$$rx = Hx(fx, fy; \phi, \theta)$$

$$ry = Hy(fx, fy; \phi, \theta) \quad (7)$$

The face direction conversion unit 22 is able to generate the frontal face image, by executing the above-described processing for each of the pixels on the frontal face image.

In addition, the face direction conversion unit 22 calculates, in accordance with equation (7), a corresponding position on the frontal face image corresponding to each of facial part feature points on the normalized face image. The face direction conversion unit 22 then determines the corresponding position of each of the facial part feature points as the position of the facial part feature point on the frontal face image. The face direction conversion unit 22 then outputs the generated frontal face image and the position of each of the facial part feature points on the frontal face image to the face reversing unit 23.

The face reversing unit 23 is an example of a reversing direction matching unit, and horizontally reverses, for each of the presumed face directions, a frontal face image generated based on the presumed face direction, thereby generating a reversed face image. For example, the face reversing unit 23 calculates, for each of the pixels of the frontal face image, coordinates of a corresponding pixel on the reversed face image in accordance with the following equation.

$$fx2 = ww - fx$$

$$fy2 = fy \quad (8)$$

fx and fy represent a horizontal coordinate and a vertical coordinate of an interest pixel on the frontal face image, and fx2 and fy2 represent a horizontal coordinate and a vertical coordinate of a pixel on the reversed face image corresponding to the interest pixel (fx, fy). ww represents a right-end coordinate of the frontal face image when an origin (0, 0) of the frontal face image is at an upper-left end of the frontal face image.

The face reversing unit 23 is able to generate the reversed face image by determining, for each of the pixels of the frontal face image, the value of the pixel as the value of the corresponding pixel of the reversed face image. In addition, the face reversing unit 23 is able to calculate, for each of the facial part feature points of the frontal face image, a position on the reversed face image in accordance with the equation (8).

When the presumed face direction is correct, i.e., when the presumed face direction is equal to the direction of the face represented on an input image, the face represented on the frontal face image is directed to the front. Thus, in this case, the face is horizontally reversed with a vicinity of a median line of the face as a reference. In addition, faces generally have high left-right symmetry. Thus, the face represented on a reversed face image has a high degree of similarity with the face represented on the frontal face image. When the presumed face direction is different from the direction of the face represented on an input image, however, the face represented on the frontal face image is not directed to the front. Thus, in this case, the face is horizontally reversed with a position deviated from a median line of the face as a reference. As a result, the face represented on the reversed face image has a low degree of similarity with the face represented on the frontal face image. Further, in some cases, the face represented on a reversed face image is distorted.

Further, the face reversing unit 23 converts the reversed face image into an original face direction in accordance with the presumed face direction to thereby generate a reversed face image for comparison. For this purpose, the face reversing unit 23 calculates, based on a three-dimensional face shape model, a corresponding position on the reversed face image corresponding to each of pixels on the reversed face image for comparison, similarly to the face direction conversion unit 22. The face reversing unit 23 projects, for each of the pixels on the reversed face image for comparison, the pixel onto a three-dimensional face shape model in the presumed face direction to calculate a projected point. The face reversing unit 23 then calculates a three-dimensional position of each projected point when the three-dimensional face shape model is rotated in such a way that the face of the three-dimensional face shape model is directed to the front. The face reversing unit 23 then calculates, for each of the pixels on the reversed face image for comparison, a corresponding point on the reversed face image by projecting a corresponding projected point when the three-dimensional face shape model is directed to the front onto the reversed face image, and determines the pixel value of the corresponding point as the value of the pixel on the reversed face image for comparison. Note that the face reversing unit 23 may also calculate the pixel value of the corresponding point by interpolation using a pixel value neighboring the corresponding point, similarly to the face direction conversion unit 22.

The face reversing unit 23 calculates a corresponding position f=(fx, fy) on the reversed face image corresponding to an interest pixel d=(dx, dy) on the reversed face image for comparison in accordance with the following equation.

$$fx = H2x(dx, dy; -\phi, -\theta)$$

$$fy = H2y(dx, dy; -\phi, -\theta) \quad (9)$$

Wherein $-\phi$ and $-\theta$ represent a yaw angle and a pitch angle for rotating the three-dimensional face shape model in such a way as to direct the face to the front direction from the presumed face direction. In addition, functions H2x(dx, dy;$-\phi$,$-\theta$) and H2y(dx, dy;$-\phi$,$-\theta$) represent equations (4) to (6) in a collective manner, similarly to equation (7). However, in H2x(dx, dy;$-\phi$,$-\theta$) and H2y(dx, dy;$-\phi$,$-\theta$), the three-dimensional face shape model onto which the interest pixel d=(dx, dy) is projected is obtained by being rotated about a yaw axis and a pitch axis from the front direction in accordance with the presumed face direction, i.e., by being rotated by ($\phi$, $\theta$). In addition, regarding elements of the rotation matrixes $R_\phi$ and $R_\theta$ in equation (5), $\phi$ and $\theta$ are replaced with $-\phi$ and $-\theta$.

The face reversing unit 23 calculates, for each of the facial part feature points on the reversed face image, a corresponding position on the reversed face image for comparison in accordance with the equation (9). The face reversing unit 23 then determines the corresponding position of each of the facial part feature points as the position of the facial part feature point on the reversed face image for comparison.

Figure 6B:
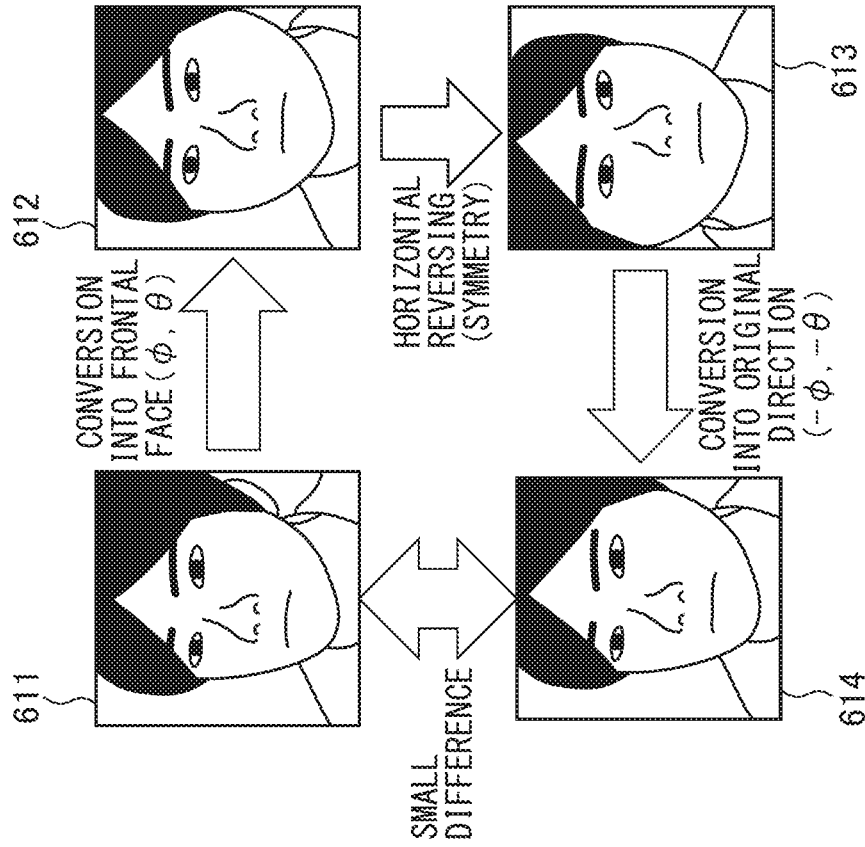
FIG. 6B illustrates an example of images used in a face direction estimation process when the presumed face direction is correct.
Figure 6A:
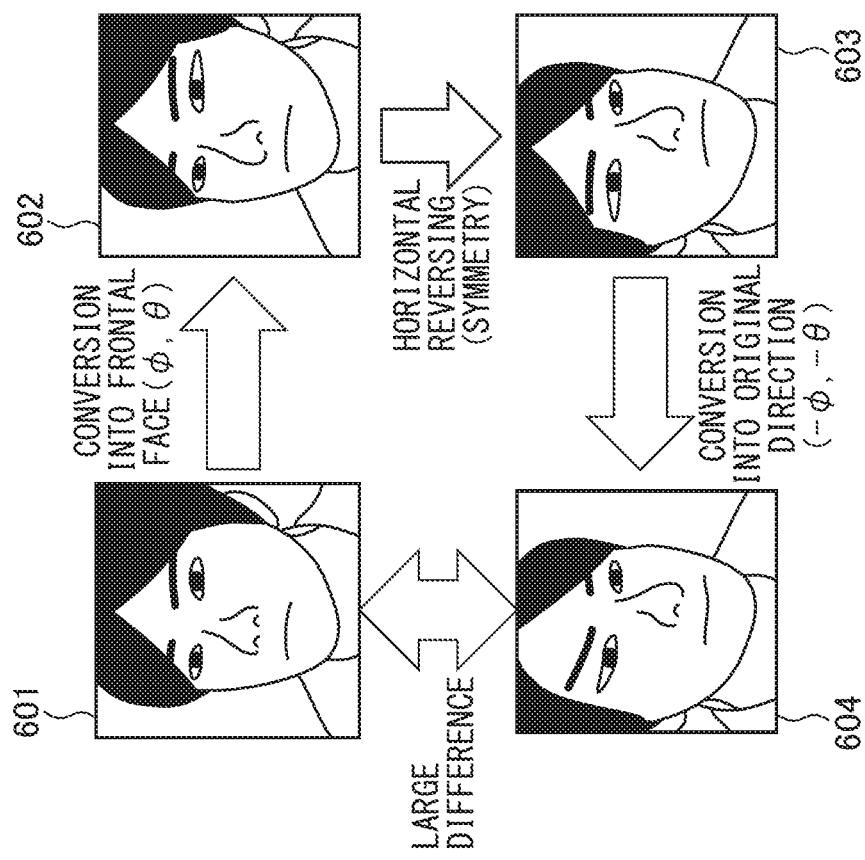
FIG. 6A illustrates an example of images used in a face direction estimation process when the presumed face direction is incorrect.

FIG. 6A illustrates an example of images used in a face direction estimation process when the presumed face direction is incorrect. When the presumed face direction is incorrect, face distortion is increased through generation of a frontal face image 602 by converting the direction of the face represented on an input image 601 in accordance with the presumed face direction and generation of a reversed face image 603 by reversing the frontal face image 602. Further, face distortion is further increased through generation of a reversed face image for comparison 604 by converting the direction of the face represented on the reversed face image 603 to the original direction in accordance with the presumed face direction. As a result, the face represented on the reversed face image for comparison 604 is largely different from the face represented on the input image 601. As described above, in the present embodiment, influence due to the difference between the presumed face direction and the actual face direction on the input image 601 is emphasized through generation of the frontal face image 602, the reversed face image 603, and the reversed face image for comparison 604. Thus, even when the presumed face direction is not largely different from the actual face direction on the input image 601, the difference between the face represented on the input image 601 and the face represented on the reversed face image for comparison 604 is enlarged.

FIG. 6B illustrates an example of images used in a face direction estimation process when the presumed face direction is correct. In this case, face distortion does not significantly occur throughout generation of a frontal face image 612, a reversed face image 613, and a reversed face image for comparison 614. As a result, the face represented on the reversed face image for comparison 614 is less different from the face represented on an input image 611.

Accordingly, the control unit 4 is able to evaluate as to whether or not the presumed face direction is correct, by checking the degree of difference in faces between the input image and the reversed face image for comparison.

The face reversing unit 23 outputs the reversed face image for comparison and the position of each of the facial part feature points on the reversed face image for comparison to the evaluation value calculation unit 25.

The face direction inverse-reversing unit 24 generates, from a reference face image that represents an average face directed to the front direction, for each of the presumed face directions, a correction reference face image in which the average face is the presumed face direction in accordance with equation (9). Note that the reference face image is stored in the storage unit 3 in advance. Note that the reference face image may be the same as the face extraction model image, or may be an image different from the face extraction model image. Note that, as will be described later, when the correction reference face image is not used in the calculation of an evaluation value, the face direction inverse-reversing unit 24 may be omitted.

The face direction inverse-reversing unit 24 outputs the correction reference face image to the evaluation value calculation unit 25.

The evaluation value calculation unit 25 compares, for each of the presumed face directions, an input image with a reversed face image for comparison to calculate an evaluation value that represents the degree of difference between the face represented on the input image and the face represented on the reversed face image for comparison.

In the present embodiment, the evaluation value calculation unit 25 calculates an evaluation value in accordance with the following three indices.

With reference to FIGS. 7A to 7C, each of the indices will be explained.

(1) Difference degree S1 between face represented on input image and face represented on reversed face image for comparison:

As illustrated in FIG. 7A, the difference in luminance between each pixel of an input image 701 and the corresponding pixel of the reversed face image for comparison 702 is calculated, and the sum of the absolute value of the difference is calculated as the difference degree S1. When the presumed face direction is correct, it is expected that the face represented on the input image and the face represented on the reversed face image for comparison are directed in the same direction. In addition, a human face generally has high left-right symmetry, and thus, the difference degree S1 is small. On the other hand, when the presumed face direction is largely different from the actual face direction, the pixel value of each position on the face of the reversed face image for comparison is calculated by referring to the pixel value of a different position on the face, and thus, the difference degree S1 increases. The difference degree S1 is calculated in accordance with, for example, the following equation.

$$S1 = \sum_{(x,y) \in FR} |I(x, y) - D(x, y)| \quad (10)$$

Wherein I(x, y) represents the value of a pixel of coordinate (x, y) on the input image, and D(x, y) represents the value of the pixel of coordinate (x, y) on the reversed face image for comparison. In addition, FR represents the entire reversed face image for comparison.

(2) Difference degree S2 in positions between facial part feature point represented on input image and facial part feature point represented on reversed face image for comparison:

As illustrated in FIG. 7B, for each facial part feature point, the difference between position (Ix, Iy) on the input image 711 and position (Dx, Dy) on the reversed face image for comparison 712 is calculated, and the sum of the absolute value of the difference is calculated as the difference degree S2. When the presumed face direction is correct, it is expected that the position of each facial part feature point on the input image and the position of a corresponding facial part feature point on the reversed face image for comparison are substantially the same. Thus, the difference degree S2 is small. On the other hand, when the presumed face direction is largely different from the actual face direction, it is expected that the position of each facial part feature point on the input image and the position of the corresponding facial part feature point on the reversed face image for comparison are also largely different, and thus, the difference degree S2 increases. The difference degree S2 is calculated in accordance with, for example, the following equation.

$$S2 = \sum_{k=1}^{K} \{|Ix(k) - Dx(k)| + |Iy(k) - Dy(k)|\} \quad (11)$$

Wherein Ix(k) and Iy(k) represent the horizontal position and the vertical position of the k-th facial part feature point on the input image. In addition, Dx(k) and Dy(k) represent the horizontal position and the vertical position of the k-th facial part feature point on the reversed face image for comparison. K is the total number of facial part feature points used in the calculation of the difference degree S2.

(3) Difference degree S3 between face represented on normalized face image and face represented on correction reference face image As illustrated in FIG. 7C, the difference in luminance between each pixel of the normalized face image 721 and the corresponding pixel of the correction reference face image 722 is calculated, and the sum of the absolute value of the difference is calculated as the difference degree S3. A structure of a human face is similar to some extent even between different human faces, and thus, when the presumed face direction is correct, the difference between the face represented on the normalized face image and the reference face image represented on the correction reference face image is small. Thus, the difference degree S3 also is small. On the other hand, as the difference between the presumed face direction and the actual face direction increases, the difference between the direction of the face represented on the normalized face image and the direction of the reference face image represented on the correction reference face image is large. Thus, as the difference between the presumed face direction and the actual face direction increases, the difference between the face represented on the normalized face image and the reference face image represented on the correction reference face image also is large, and therefore the difference degree S3 also increases. The difference degree S3 is calculated in accordance with, for example, the following equation.

$$S3 = \sum_{(x,y) \in FR} |I(x, y) - M(x, y)| \quad (12)$$

Wherein I(x, y) represents the value of pixel of coordinate (x, y) on the normalized face image, and M(x, y) represents the value of pixel of coordinate (x, y) on the correction reference face image. In addition, FR represents the entire correction reference face image.

The evaluation value calculation unit 25 calculates the evaluation value S($\phi$, $\theta$) based on the difference degrees S1 to S3 described above. For example, the evaluation value calculation unit 25 calculates the evaluation value S($\phi$, $\theta$) in accordance with the following equation.

$$S(\phi,\theta)=a1 \cdot S1+a2 \cdot S2+a3 \cdot S3 \quad (13)$$

Wherein a1 to a3 are weight coefficients for the difference degrees S1 to S3, respectively, and are set to, for example, a1=0.4, and a2=a3=0.3. Note that a1 to a3 may be set to the same value.

Note that, according to a modification example, the evaluation value calculation unit 25 may calculate the difference degree S1 itself as the evaluation value S($\phi$,$\theta$) (i.e., the evaluation value calculation unit 25 may set a2 and a3 to 0 in equation (13)). Alternatively, the evaluation value calculation unit 25 may calculate the evaluation value S($\phi$, $\theta$) by weighting the difference degree S1 and one of the difference degrees S2 and S3. In this case, the evaluation value calculation unit 25 may set, for example, a1 to 0.6, and may set one of a2 and a3 to 0.4 and the other to 0 in equation (13).

The evaluation value calculation unit 25 outputs the presumed face direction ($\phi$, $\theta$) and the evaluation value S($\phi$, $\theta$) to the face direction estimation unit 26.

The face direction estimation unit 26 estimates the direction of the face represented on the input image based on evaluation value S($\phi$, $\theta$) for each presumed face direction. In the present embodiment, the face direction estimation unit 26 calculates the minimum value Smin of the evaluation value S($\phi$, $\theta$) from among evaluation values S($\phi$, $\theta$) for the respective assumed face directions. The face direction estimation unit 26 then estimates that the face direction corresponding to the minimum value Smin of the evaluation value is the direction of the face represented on the input image. The face direction estimation unit 26 outputs the estimated face direction.

Note that the face direction estimation unit 26 may calculate Smin after the evaluation value S($\phi$, $\theta$) has been calculated for all presumed face directions. Alternatively, every time the evaluation value S($\phi$, $\theta$) for a presumed face direction is calculated, the face direction estimation unit 26 may compare the evaluation value S($\phi$, $\theta$) with the minimum value of a previous evaluation value (hereinafter, referred to as a provisional minimum value). When the evaluation value S($\phi$, $\theta$) is smaller than the provisional minimum value, the face direction estimation unit 26 may then update the provisional minimum value with the evaluation value S($\phi$, $\theta$), and may store the updated provisional minimum value and the corresponding face direction ($\phi$, $\theta$) in the storage unit 3.

Figure 8:
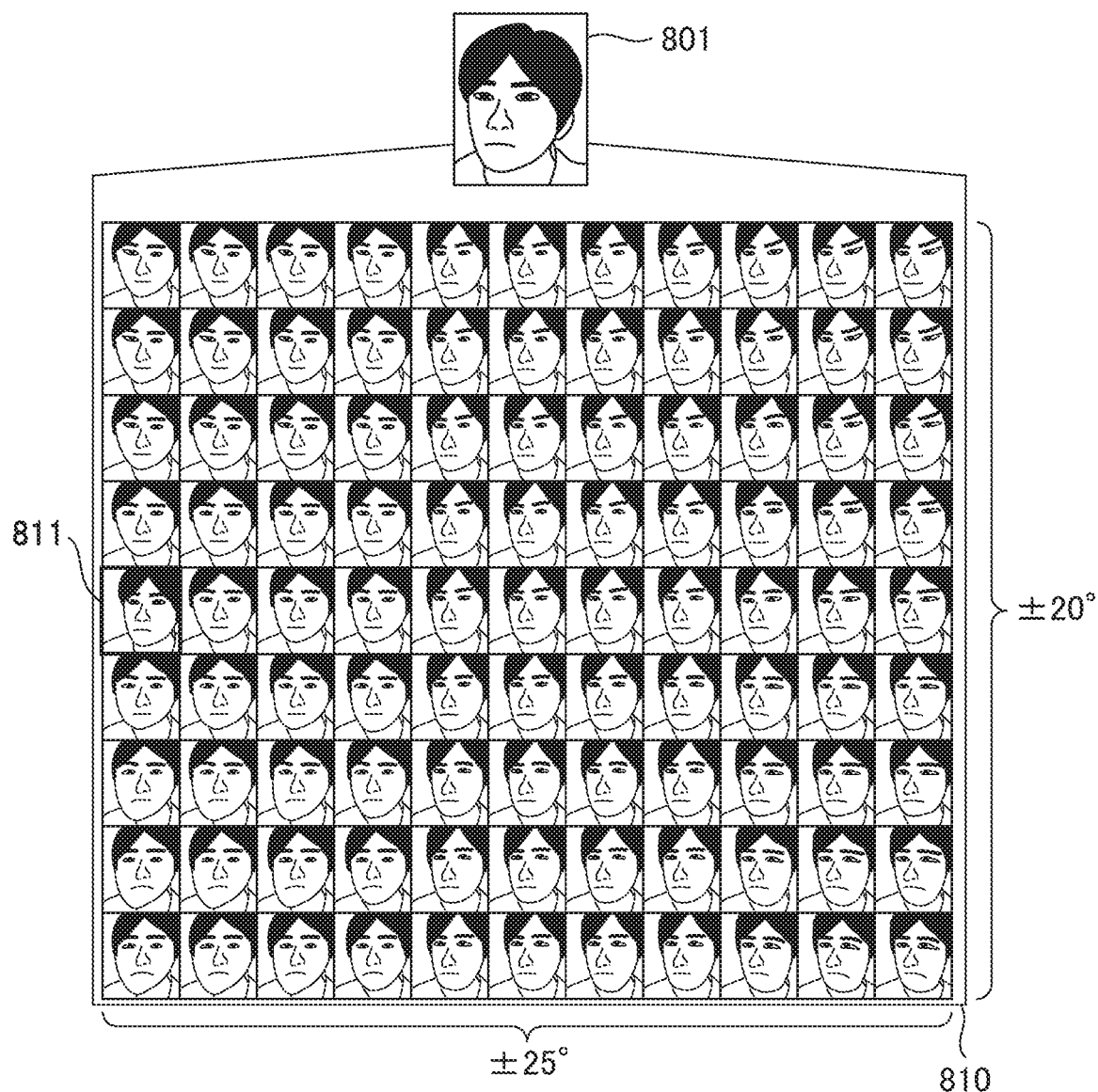
FIG. 8 illustrates an example of an input image and respective reversed face images for comparison within a prescribed range of face directions.

FIG. 8 is a drawing illustrating an example of an input image and respective reversed face images for comparison within a prescribed range of face directions. In this example, reversed face images for comparison are generated on a 5° basis for both the yaw angle and the pitch angle, within a yaw angle range of ±25° with the front direction as center, and within a pitch angle range of ±20° with the front direction as center. In the example illustrated in FIG. 8, a reversed face image for comparison 811 at a yaw angle of −25° and a pitch angle of 0° is most similar to an input image 801, among a pair 810 of the generated reversed face images for comparison. In other words, the evaluation value S (−25°, 0°) calculated for the reversed face image for comparison 811 is the minimum value. Accordingly, it is estimated that (−25°, 0°) is the direction of the face represented on the input image.

Figure 9:
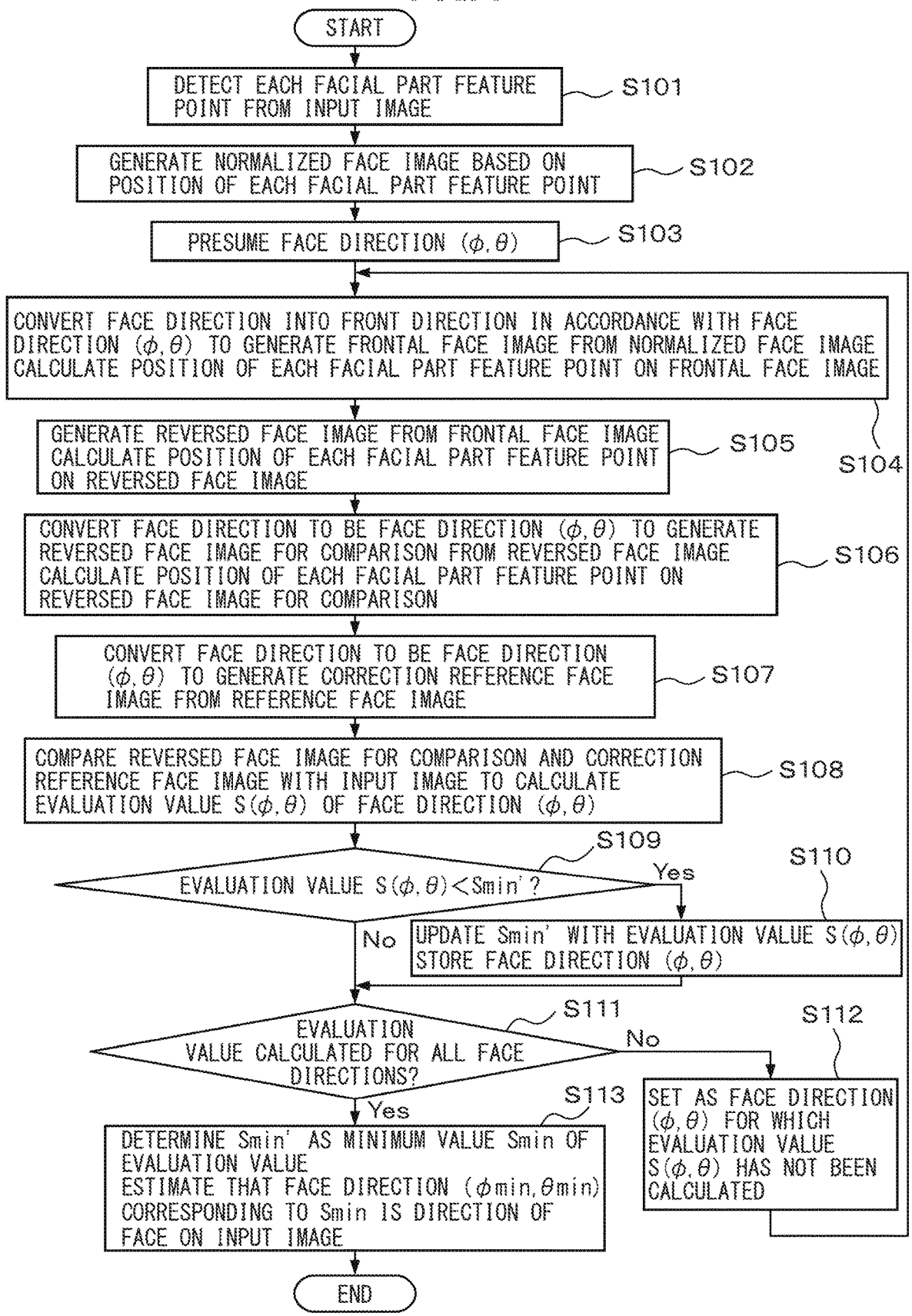
FIG. 9 is an operation flowchart of a face direction estimation process.

FIG. 9 is an operation flowchart of the face direction estimation process. The control unit 4 estimates, for each input image, the direction of the face represented on the image in accordance with this operation flowchart. Note that the control unit 4 sets the provisional minimum value Smin' of the evaluation value to an initial value (for example, the maximum value of the assumed evaluation value) at the start of this operation flowchart.

The face detection unit 21 detects each of the facial part feature points on the driver's face represented on the input image (Step S101). The face detection unit 21 then generates a normalized face image based on the position of each of the facial part feature points (Step S102).

The control unit 4 presumes the face direction ($\phi$, $\theta$) within the prescribed range of face directions (Step S103). The face direction conversion unit 22 then converts, in accordance with the presumed face direction ($\phi$, $\theta$), the direction of the face represented on the normalized face image into a front direction to thereby generate a frontal face image. In addition, the face direction conversion unit 22 calculates, in accordance with the presumed face direction ($\phi$, $\theta$), the position of each of the facial part feature points on the frontal face image (Step S104).

The face reversing unit 23 horizontally reverses the face represented on the frontal face image to generate a reversed face image, and calculates the position of each of the facial part feature points on the reversed face image (Step S105).

Further, the face reversing unit 23 converts the direction of the face represented on the reversed face image to be the presumed face direction ($\phi$, $\theta$) to generate a reversed face image for comparison. In addition, the face reversing unit 23 calculates the position of each of the facial part feature points on the reversed face image for comparison (Step S106). Further, the face direction inverse-reversing unit 24 converts the direction of the face represented on a reference face image to be the presumed face direction ($\phi$, $\theta$) to generate a correction reference face image (Step S107).

The evaluation value calculation unit 25 calculates the evaluation value S($\phi$, $\theta$) of the face direction for the presumed face direction ($\phi$, $\theta$) by comparing the reversed face image for comparison and the correction reference face image with the input image (Step S108). The face direction estimation unit 26 then determines whether or not the evaluation value S($\phi$, $\theta$) is smaller than the provisional minimum value Smin' of the evaluation value (Step S109).

When the evaluation value S($\phi$, $\theta$) is smaller than the provisional minimum value Smin' of the evaluation value (Step S109-Yes), the face direction estimation unit 26 updates the provisional minimum value Smin' with the evaluation value S($\phi$, $\theta$) (Step S110). The face direction estimation unit 26 then stores the updated provisional minimum value Smin' and the corresponding face direction ($\phi$, $\theta$) in the storage unit 3. On the other hand, when the evaluation value S($\phi$, $\theta$) is equal to or greater than the provisional minimum value Smin' of the evaluation value (Step S109-No), the face direction estimation unit 26 does not update the provisional minimum value Smin'.

After Step S110, or when the provisional minimum value Smin' of the evaluation value is not updated (Step S109-No), the control unit 4 determines whether or not the evaluation value S($\phi$, $\theta$) has been calculated for all face directions within the prescribed range of face directions (Step S111). When a face direction for which the evaluation value S($\phi$, $\theta$) has not been calculated is present within the prescribed range of face directions (Step S111-No), the control unit 4 sets the face direction for which the evaluation value S($\phi$, $\theta$) has not been calculated within the prescribed range of face directions as the presumed face direction (Step S112). The control unit 4 then executes the processing of Step S104 and subsequent steps.

On the other hand, when the evaluation value S($\phi$, $\theta$) has been calculated for all face directions within the prescribed range of face directions (Step S111-Yes), the face direction estimation unit 26 determines that the provisional minimum value Smin' of the evaluation value stored in the storage unit 3 is the minimum value Smin of the evaluation value. The face direction estimation unit 26 then estimates that the face direction ($\phi_{min}$, $\theta_{min}$) corresponding to the minimum value Smin is the direction of the driver's face represented on the input image (Step S113). Thereafter, the control unit 4 ends the face direction estimation process.

The control unit 4 determines whether or not the estimated face direction satisfies a prescribed condition, and outputs a signal in accordance with the result of the determination to another device via the communication interface unit 5. For example, the control unit 4 determines whether or not the estimated face direction is included in the range of face directions in which it is assumed that the driver looks at the front of the vehicle 10 (hereinafter, referred to as a normal range). Note that the normal range is stored in, for example, the storage unit 3 in advance. When the estimated face direction is included in the normal range, the control unit 4 determines that the driver looks at the front of the vehicle 10. On the other hand, when the estimated face direction is outside of the normal range, the control unit 4 determines that the driver is looking aside. When determining that the driver is looking aside for each of the input images that are acquired in a prescribed period (for example, 0.5 seconds to 1 second), the control unit 4 then outputs a warning sound via a speaker (not illustrated) provided in the interior of the vehicle 10 via the communication interface unit 5.

As described above, this face direction estimation device converts, in accordance with a presumed face direction, the direction of the face on an input image in such a way as to direct the face to the front, and thereafter horizontally reverses the face. Then, this face direction estimation device again converts the direction of the reversed face to be the presumed face direction to obtain a reversed face image for comparison, and compares the reversed face image for comparison with the original input image. Thus, through the conversion of the face direction and the horizontal reversing of the face, the difference between the position of each part of the face on the reversed face image for comparison and the corresponding position of the face on the original input image is enlarged in accordance with the difference between the presumed face direction and the actual face direction. Thus, even when the difference between the presumed face direction and the actual face direction is relatively small, the difference in faces between the reversed face image for comparison and the original input image is emphasized. As a result, even when the difference between the presumed face direction and the actual face direction is relatively small, the evaluation value that represents the degree of difference in faces between the reversed face image for comparison and the input image varies in accordance with the difference. Accordingly, this face direction estimation device can accurately estimate the direction of the face represented on the original image by specifying the face direction that minimizes the evaluation value.

According to a modification example, the face direction conversion unit 22 may convert the direction of the face represented on the normalized face image to the direction opposite to the presumed face direction relative to a front direction, i.e., may convert the direction of the face represented on the normalized face image to be rotated twice the presumed face direction across the front direction to generate an opposite image. Note that the opposite image is another example of a face direction converted image. In this case as well, the face direction conversion unit 22 may use a three-dimensional face shape model to convert the face direction, similarly to the above-described embodiment. In other words, the face direction conversion unit 22 may calculate, for each of the pixels on the opposite image, a corresponding point on the normalized face image in accordance with equations (4) to (6), and may determine the pixel value of the corresponding point as being the value of the pixel on the opposite image. However, in this case, the face direction conversion unit 22 projects each of the pixels on the opposite image onto the three-dimensional face shape model whose face is directed opposite to the presumed face direction relative to the front direction. The face direction conversion unit 22 then sets, for elements of each of the rotation matrixes in equation (5), a yaw angle and a pitch angle that are twice the presumed face direction.

In this case, since the face reversing unit 23 horizontally reverses the opposite image, the face direction is returned to the original direction and the face is horizontally reversed, and thus, a reversed face image for comparison can be obtained. Note that the face direction inverse-reversing unit 24 may generate, in this modification example as well, a correction reference face image from the reference face image, similarly to the above-described embodiment.

Figure 10:
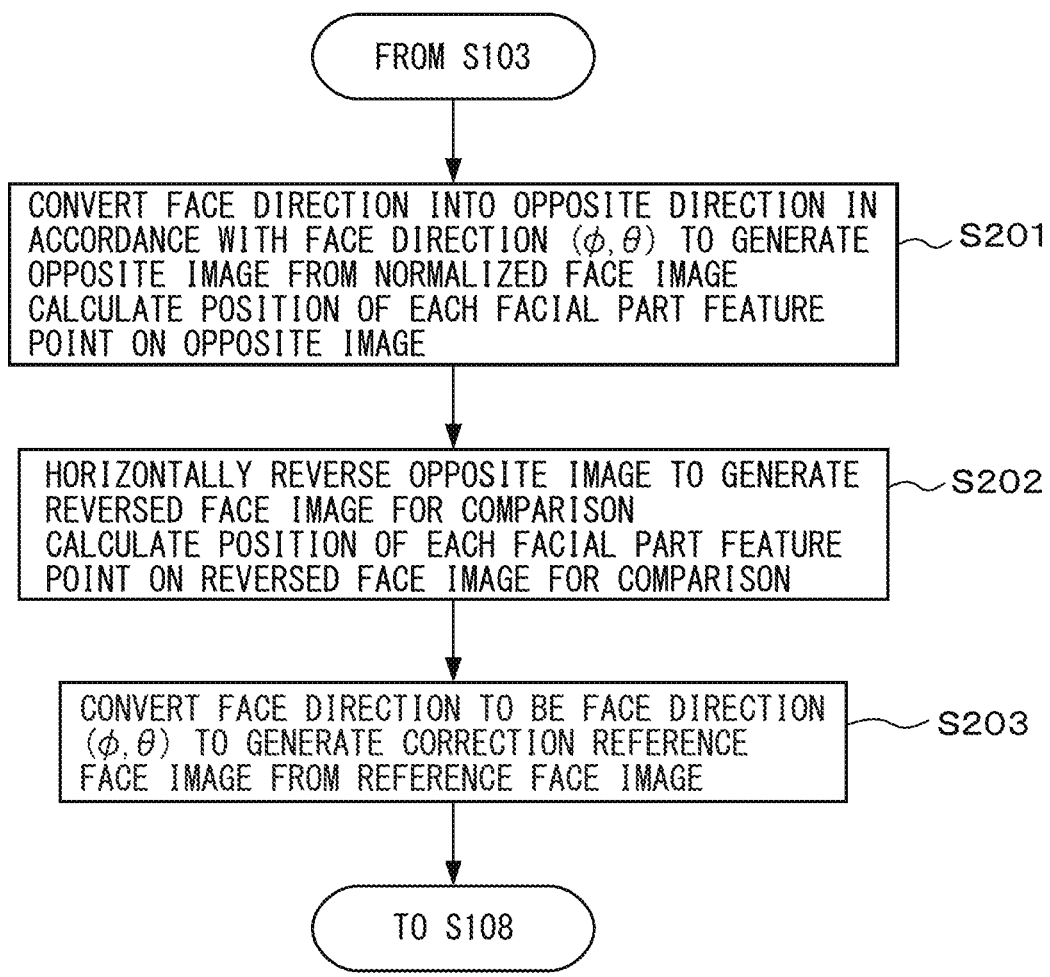
FIG. 10 is an operation flowchart of a face direction estimation process according to a modification example.

FIG. 10 is an operation flowchart of the face direction estimation process according to a modification example. Note that the control unit 4 may execute processing of the steps illustrated in FIG. 10, instead of the processing of Steps S104 to S107 in the operation flowchart illustrated in FIG. 9.

When the face direction ($\phi$, $\theta$) is presumed in Step S103, the face direction conversion unit 22 converts the direction of the face on the normalized face image to a direction opposite to the face direction ($\phi$, $\theta$) to generate an opposite image. In addition, the face direction conversion unit 22 calculates the position of each of the facial part feature points on the opposite image (Step S201).

The face reversing unit 23 horizontally reverses the opposite image to generate a reversed face image for comparison (Step S202). In addition, the face direction inverse-reversing unit 24 converts the direction of the face represented on the reference face image so that the direction is the presumed face direction ($\phi$, $\theta$) to generate a correction reference face image (Step S203). The control unit 4 then executes the process of Step S108 and the subsequent steps.

According to this modification example, since the control unit 4 is able to omit, the process of converting the face direction once for each presumed face direction, the computation amount can be reduced.

According to another modification example, face extraction model images having mutually different face directions may be prepared. The face detection unit 21 may calculate, for each of the face extraction model images, an affine transformation parameter by using the position of each of the facial part feature points detected from an input image. The face detection unit 21 may then select a face extraction model image that minimizes the sum of the absolute value of the affine transformation parameter, and may use the affine transformation parameter corresponding to the selected face extraction model image to generate a normalized face image. Since this enables the face detection unit 21 to generate the normalized face image based on the face extraction model image having a face direction relatively close to the actual face direction, the normalized face image can be prevented from undergoing face distortion. Further, in this case, the control unit 4 may limit the range of face directions to be presumed, in accordance with the selected face extraction model image. For example, the control unit 4 may set, as the range of face directions to be presumed, a range of ±10° for each of the yaw angle direction and the pitch angle direction with the direction of the face represented on the selected face extraction model image as center. Since this reduces the number of face directions to be presumed, the computation amount of the face direction estimation process can be reduced.

According to still another modification example, the face reversing unit 23 may convert, in accordance with the presumed face direction, the direction of the face represented on an input image so that the face is directed to the front direction to generate a face image for comparison. In this case, the face reversing unit 23 is able to generate the face image for comparison by executing, on the input image, the same process as the process of generating a frontal face image from a normalized face image, which is executed by the face direction conversion unit 22. The evaluation value calculation unit 25 may then calculate an evaluation value S($\phi$, $\theta$) by calculating difference degrees S1 and S2 between the face image for comparison and the reversed face image, and calculating the difference degree S3 between the face image for comparison and a reference face image.

In some cases, the person to be the target of the face direction estimation and the camera for photographing the person may be in a substantially fixed positional relationship. Alternatively, the person to be the target of the face direction estimation may be limited to a particular person. For example, in the above-described embodiment or the modification example thereof, the driver may be the owner of the vehicle 10. In such a case, the positions of facial part on an input image do not often vary due to factors other than the face direction. In view of this, according to still another modification example, the face detection unit 21 may not generate a normalized face image. In this case, the face direction conversion unit 22 may use the input image itself, instead of the normalized face image.

A computer program that implements the functions of the respective units of the control unit according to the above-described embodiment or the modification example may be provided in a form recorded on a computer-readable portable recording medium, such as a semiconductor memory, a magnetic recording medium, or an optical recording medium. Note that the recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium having recorded thereon a computer program for face direction estimation that causes a computer to execute a process comprising:
inputting an input image representing a face;
generating, for each face direction presumed for the face represented on the input image, a face direction converted image by converting the direction of the face represented on the input image into a prescribed direction in accordance with the presumed face direction;
generating, for each of the presumed face directions, a reversed face image by reversing the face represented on the face direction converted image;
converting, for each of the presumed face directions, the direction of the face represented on the reversed face image to be the presumed face direction, or converting the direction of the face represented on the input image into the prescribed direction in accordance with the presumed face direction;
calculating, for each of the presumed face directions, an evaluation value that represents a degree of difference between the face represented on the reversed face image and the face represented on the input image, by comparing the reversed face image with the input image based on a result of the conversion; and
specifying, based on the evaluation value, one face direction among the presumed face directions as the direction of the face represented on the input image.

2. The non-transitory computer-readable recording medium having recorded thereon the computer program for face direction estimation according to claim 1, wherein the process further comprises: determining whether or not the specified direction of the face represented on the input image satisfies a prescribed condition; and outputting a signal in accordance with a determination result.

3. The non-transitory computer-readable recording medium having recorded thereon the computer program for face direction estimation according to claim 1, wherein specifying the face direction includes specifying a presumed face direction corresponding to a minimum value of the evaluation value that is calculated for each of the presumed face directions as the direction of the face represented on the input image, the evaluation value being smaller as the difference decreases.

4. The non-transitory computer-readable recording medium having recorded thereon the computer program for face direction estimation according to claim 1, wherein the prescribed direction is a front direction with respect to a camera that acquires the input image.

5. The non-transitory computer-readable recording medium having recorded thereon the computer program for face direction estimation according to claim 1, wherein the prescribed direction is the direction opposite to the presumed face direction across a front direction with respect to a camera that acquires the input image.

6. The non-transitory computer-readable recording medium having recorded thereon the computer program for face direction estimation according to claim 1, wherein the process further comprises: detecting feature points of the face from the input image; and generating a normalized face image by moving a position of the face on the input image so that each of the feature points is at a prescribed position, wherein
generating the face direction converted image includes generating the face direction converted image by converting the direction of the face represented on the normalized face image into the prescribed direction in accordance with the presumed face direction.

7. The non-transitory computer-readable recording medium having recorded thereon the computer program for face direction estimation according to claim 1, wherein calculating the evaluation value includes calculating the evaluation value based on a difference in pixel values between each pixel on the input image and a corresponding pixel on the reversed face image.

8. The non-transitory computer-readable recording medium having recorded thereon the computer program for face direction estimation according to claim 7, wherein calculating the evaluation value includes calculating, for each feature points of a face, the evaluation value further based on a difference between a position of the feature point of the face on the input image and a position of the feature point of the face on the reversed face image.

9. The non-transitory computer-readable recording medium having recorded thereon the computer program for face direction estimation according to claim 7, wherein the process further comprises generating, for a reference face image representing a face directed to a front direction with respect to a camera that acquires the input image, a correction reference face image by converting the direction of the face represented on the reference face image to be the presumed face direction, wherein
calculating the evaluation value includes calculating the evaluation value further based on a difference in pixel values between each pixel on the input image and a corresponding pixel on the correction reference face image.

10. A face direction estimation method comprising:
inputting an input image representing a face;
generating, for each face direction presumed for the face represented on the input image, a face direction converted image by converting the direction of the face represented on the input image into a prescribed direction in accordance with the presumed face direction;
generating, for each of the presumed face directions, a reversed face image by reversing a face represented on the face direction converted image;
converting, for each of the presumed face directions, the direction of a face represented on the reversed face image to the presumed face direction, or converting the direction of the face represented on the input image into the prescribed direction in accordance with the presumed face direction;
calculating, for each of the presumed face directions, an evaluation value that represents a degree of difference between the face represented on the reversed face image and the face represented on the input image, by comparing the reversed face image with the input image based on a result of the conversion; and
specifying, based on the evaluation value, one face direction among the presumed face directions as the direction of the face represented on the input image.

11. A face direction estimation device comprising:
a processor configured to:
generate, for each face direction presumed for the face represented on an input image representing a face, a face direction converted image by converting the direction of the face represented on the input image into a prescribed direction in accordance with the presumed face direction;
generate, for each of the presumed face directions, a reversed face image by reversing a face represented on the face direction converted image;

convert the direction of a face represented on the reversed face image to the presumed face direction, or convert the direction of the face represented on the input image into the prescribed direction in accordance with the presumed face direction;

calculate, for each of the presumed face directions, an evaluation value that represents a degree of difference between the face represented on the reversed face image and the face represented on the input image, by comparing the reversed face image with the input image based on a result of the conversion; and specify, based on the evaluation value, one face direction among the presumed face directions as the direction of the face represented on the input image.

12. The face direction estimation device according to claim 11, wherein the processor is further configured to:
determine whether or not the specified direction of the face represented on the input image satisfies a prescribed condition; and
output a signal in accordance with a determination result.

13. The face direction estimation device according to claim 11, wherein specifying the face direction includes specifying a presumed face direction corresponding to a minimum value of the evaluation value that is calculated for each of the presumed face directions as the direction of the face represented on the input image, the evaluation value being smaller as the difference decreases.

14. The face direction estimation device according to claim 11, wherein the prescribed direction is a front direction with respect to a camera that acquires the input image.

15. The face direction estimation device according to claim 11, wherein the prescribed direction is the direction opposite to the presumed face direction across a front direction with respect to a camera that acquires the input image.

16. The face direction estimation device according to claim 11, wherein the processor is further configured to:
detect feature points of the face from the input image; and
generate a normalized face image by moving a position of the face on the input image so that each of the feature points is at a prescribed position, wherein
generating the face direction converted image includes generating the face direction converted image by converting the direction of the face represented on the normalized face image into the prescribed direction in accordance with the presumed face direction.

17. The face direction estimation device according to claim 11, wherein calculating the evaluation value includes calculating the evaluation value based on a difference in pixel values between each pixel on the input image and a corresponding pixel on the reversed face image.

18. The face direction estimation device according to claim 17, wherein calculating the evaluation value includes calculating, for each feature points of a face, the evaluation value further based on a difference between a position of the feature point of the face on the input image and a position of the feature point of the face on the reversed face image.

19. The face direction estimation device according to claim 17, wherein the processor is further configured to generate, for a reference face image representing a face directed to a front direction with respect to a camera that acquires the input image, a correction reference face image by converting the direction of the face represented on the reference face image to be the presumed face direction, wherein
calculating the evaluation value includes calculating the evaluation value further based on a difference in pixel values between each pixel on the input image and a corresponding pixel on the correction reference face image.

* * * * *